United States Patent [19]
Wada et al.

[11] Patent Number: 5,565,907
[45] Date of Patent: Oct. 15, 1996

[54] IMAGE FORMING APPARATUS CAPABLE OF PRODUCING HIGH QUALITY HALFTONE IMAGES

[75] Inventors: Shinichiro Wada, Kawasaki; Takahiro Yagishita, Tokyo, both of Japan

[73] Assignee: Ricoh Company, Ltd., Tokyo, Japan

[21] Appl. No.: 230,558

[22] Filed: Apr. 20, 1994

[30] Foreign Application Priority Data

Apr. 20, 1993 [JP] Japan .................................. 5-093242
Jul. 16, 1993 [JP] Japan .................................. 5-176710

[51] Int. Cl.⁶ ................................................ H04N 1/21
[52] U.S. Cl. ....................... 347/251; 358/298; 358/458
[58] Field of Search ..................... 347/251, 240, 347/131; 358/296, 298, 455, 456, 458, 459

[56] References Cited

U.S. PATENT DOCUMENTS 4,903,138  2/1990  Aragaki ............................ 358/261.3
5,450,208  9/1995  Murata .............................. 358/296

*Primary Examiner*—Mark J. Reinhart
*Attorney, Agent, or Firm*—Oblon, Spivak, McClelland, Maier & Neustadt, P.C.

[57] ABSTRACT

An image forming apparatus capable of producing a high quality halftone image stably and rendering faithful tonality. For a bilevel image, the apparatus smooths the boundary between black and white. For a multilevel image, the apparatus obviates solitary dots for thereby causing dots to concentrate. As a result, a bilevel image and a multilevel image are provided with a clear boundary.

13 Claims, 18 Drawing Sheets

SCREEN ANGLE : 45°
MATRIX SIZE  : 8

SCREEN ANGLE : 45°
MATRIX SIZE : 8

SCREEN ANGLE : 33°
MATRIX SIZE : 13

SCREEN ANGLE : 26°
MATRIX SIZE : 5

| FIG.11A | FIG.11B |

FIG. 13

| SIGNAL SELECT | L | H | L | H | L | H | L | H | L | H | L | H | L | H | L | H |
|---|---|---|---|---|---|---|---|---|---|---|---|---|---|---|---|---|
| SELECTOR OUTPUT (48) | L1 | L1 | L2 | L2 | L3 | L3 | L4 | L4 | L5 | L5 | L6 | L6 | L7 | L7 | L8 | L8 |
| LINE OUTPUT (55) | | L1 | L1 | L2 | L2 | L3 | L3 | L4 | L4 | L5 | L5 | L6 | L6 | L7 | L7 | L8 |
| LINE OUTPUT (56) | | | L1 | L1 | L2 | L2 | L3 | L3 | L4 | L4 | L5 | L5 | L6 | L6 | L7 | L7 |
| LINE OUTPUT (57) | | | | L1 | L1 | L2 | L2 | L3 | L3 | L4 | L4 | L5 | L5 | L6 | L6 | L7 |
| LINE OUTPUT (58) | | | | | L1 | L1 | L2 | L2 | L3 | L3 | L4 | L4 | L5 | L5 | L6 | L6 |
| LINE OUTPUT (59) | | | | | | L1 | L1 | L2 | L2 | L3 | L3 | L4 | L4 | L5 | L5 | L6 |
| LINE OUTPUT (60) | | | | | | | L1 | L1 | L2 | L2 | L3 | L3 | L4 | L4 | L5 | L5 |
| LINE OUTPUT (61) | | | | | | | | L1 | L1 | L2 | L2 | L3 | L3 | L4 | L4 | L5 |

FIG. 14
MAIN SCAN →
| 5g | 5f | 5e |
|----|----|----|
| 4g | 4f | 4e |
| 3g | 3f | 3e |
SUBSCAN ↓
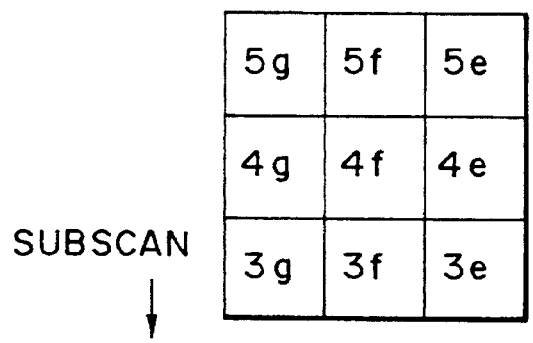
FIG. 15
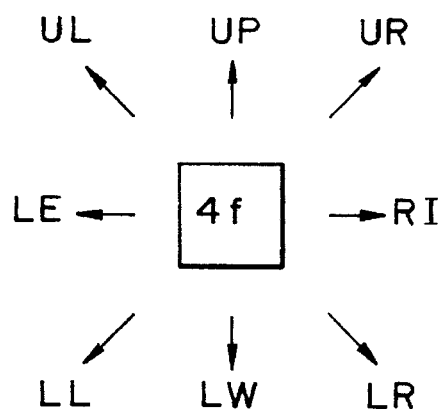
FIG. 16
| 15 | 14 | 13 |
|----|----|----|
| 14 | 4f | 10 |
| 12 | 11 | 7  |

FIG. 22
FIG. 22A
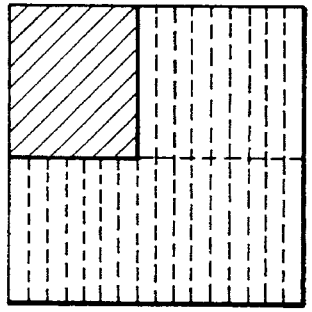
DENSITY: 2
DIRECTION: UPPER LEFT
FIG. 22B
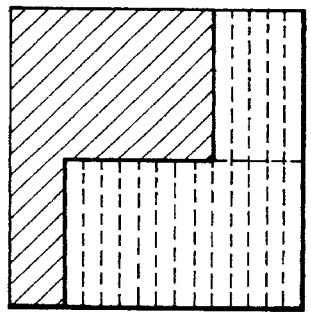
DENSITY: 7
DIRECTION: UPPER LEFT
FIG. 22C
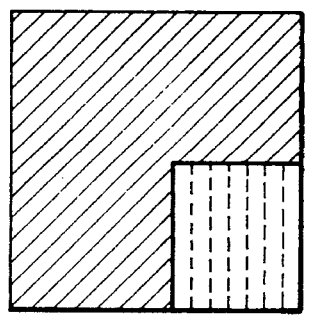
DENSITY: 14
DIRECTION: UPPER LEFT
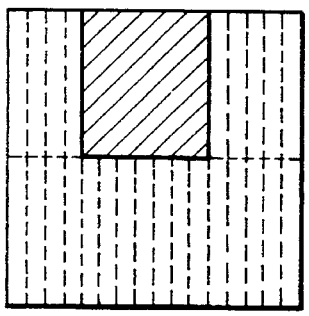
DENSITY: 2
DIRECTION: UP
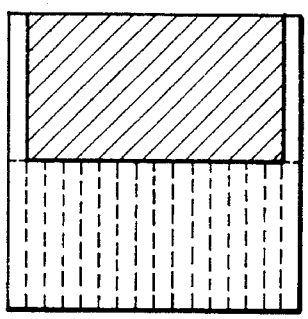
DENSITY: 7
DIRECTION: UP
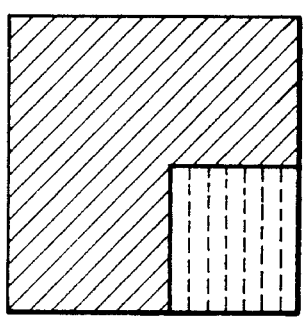
DENSITY: 14
DIRECTION: UP
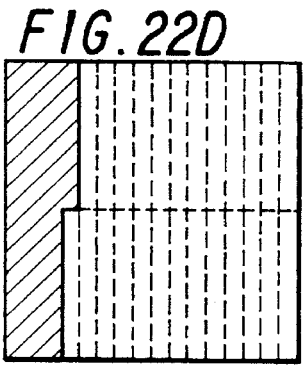
DENSITY: 2
DIRECTION: LEFT
FIG. 22G
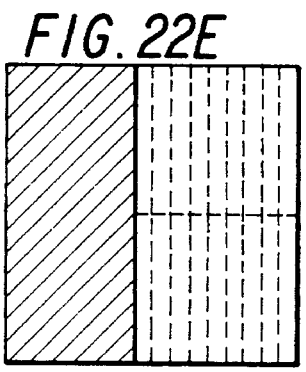
DENSITY: 7
DIRECTION: LEFT
FIG. 22H
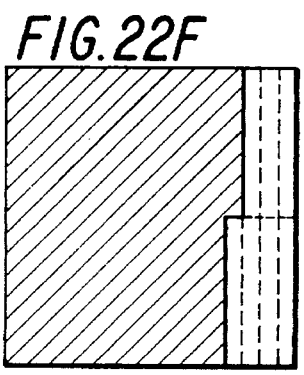
DENSITY: 14
DIRECTION: LEFT
FIG. 22I

FIG. 23

| PRIORITY ORDER | 2n-1<br>2m-1 | 2n<br>2m-1 | 2n-1<br>2m | 2n<br>2m |
|---|---|---|---|---|
| 1 | LOWER RIGHT | LOWER LEFT | UPPER RIGHT | UPPER LEFT |
| 2 | LOWER LEFT | UPPER RIGHT | UPPER LEFT | LOWER RIGHT |
| 3 | UPPER RIGHT | UPPER LEFT | LOWER RIGHT | LOWER LEFT |
| 4 | UPPER LEFT | LOWER RIGHT | LOWER LEFT | UPPER RIGHT |
| 5 | LEFT ||||
| 6 | RIGHT ||||
| 7 | UP ||||
| 8 | DOWN ||||

|  | 2n-3 | 2n-2 | 2n-1 | 2n | 2n+1 | 2n+2 |
|---|---|---|---|---|---|---|
| 2m-3 | 2 | 2 | 2 | 2 | 2 | 2 |
| 2m-2 | 2 | 2 | 2 | 2 | 2 | 2 |
| 2m-1 | 2 | 2 | 2 | 2 | 2 | 2 |
| 2m | 2 | 2 | 2 | 2 | 2 | 2 |
| 2m+1 | 2 | 2 | 2 | 2 | 2 | 2 |
| 2m+2 | 2 | 2 | 2 | 2 | 2 | 2 |

IMAGE DATA (FRAME BUFFER)

OUTPUT IMAGE

FIG. 25
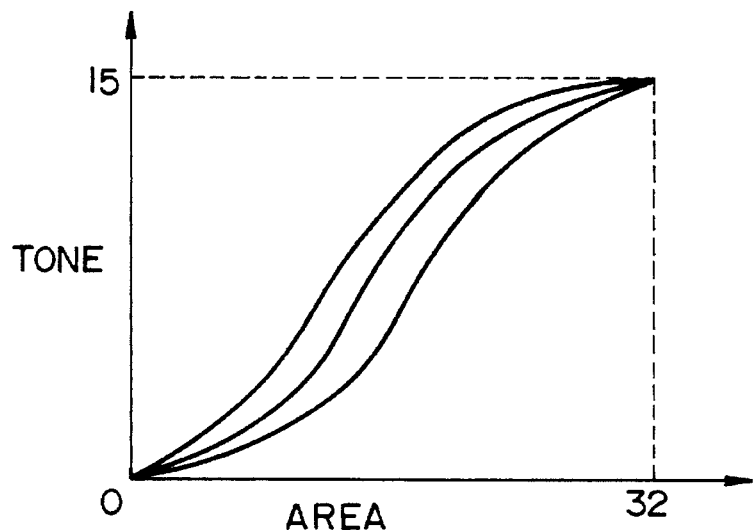
FIG. 26
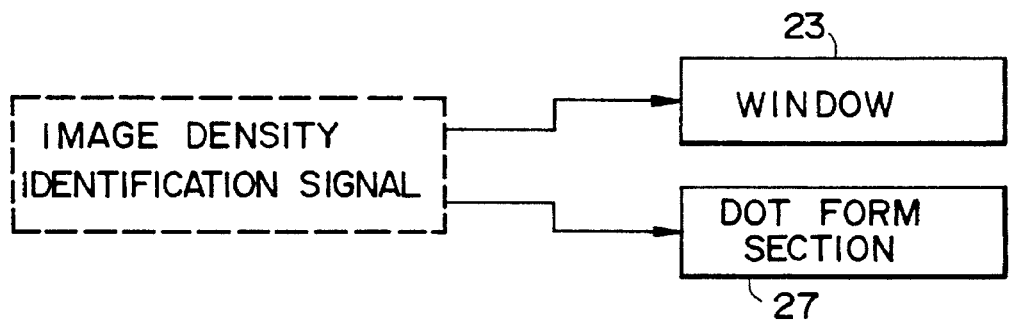
FIG. 27
| SIGNAL SELECT | L | L | L | L | L | L | L | L | L |
|---|---|---|---|---|---|---|---|---|---|
| SELECTOR OUTPUT (48) | L1 | L2 | L3 | L4 | L5 | L6 | L7 | L8 | L9 |
| LINE OUTPUT (55) | | L1 | L2 | L3 | L4 | L5 | L6 | L7 | L8 |
| LINE OUTPUT (56) | | | L1 | L2 | L3 | L4 | L5 | L6 | L7 |
| LINE OUTPUT (57) | | | | L1 | L2 | L3 | L4 | L5 | L6 |
| LINE OUTPUT (58) | | | | | L1 | L2 | L3 | L4 | L5 |
| LINE OUTPUT (59) | | | | | | L1 | L2 | L3 | L4 |
| LINE OUTPUT (60) | | | | | | | L1 | L2 | L3 |
| LINE OUTPUT (61) | | | | | | | | L1 | L2 |

IMAGE FORMING APPARATUS CAPABLE OF PRODUCING HIGH QUALITY HALFTONE IMAGES

BACKGROUND OF THE INVENTION

The present invention relates to a copier, facsimile apparatus, laser printer or similar digital image forming apparatus and, more particularly, to an image forming apparatus capable of producing high quality halftone images.

Today, it is a common practice with a computer to use an image output unit implemented as a laser beam printer or similar electrophotographic image forming apparatus. This kind of image forming apparatus has sharply extended a desktop publishing field due to various advantages available therewith, e.g., high image quality and low noise. At the same time, in parallel with the increasing memory size, processing speed and functions and decreasing cost of a controller used to control, for example, a laser beam printer, there has been extensively used a method capable not only of printing out data in black and white, i.e., in two levels, but also of converting multilevel image data to bilevel image data by a dither method or a density pattern method and then printing out the bilevel data. A pulse width modulation (PWM) system has been recently proposed as an advanced approach which implements resolution and halftone reproducibility simultaneously at a higher level. The PWM system is advantageous over the bilevel dither method and density pattern method in that it reduces the matrix size for halftone having a given tone value. Specifically, an PWM type image forming apparatus receives image data in the form of a multilevel signal and drives a laser by a pulse width matching the level of the signal, thereby providing a single dot with tonality. However, the problem with the PWM scheme is that several dots have to be subjected to PWM at the same time, resulting in low resolution even when characters or lines are printed.

In light of the above, there has also been proposed a printer capable of printing each of a photograph or similar halftone image (multilevel image) and a character or similar text image (bilevel image) in different resolution. The kind of printer prints a bilevel image in a resolution of 300 dots per inch (dpi) or prints a multilevel image in a resolution of 150 dpi by PWM. All the bilevel images are written to a bilevel image memory while multilevel images are drawn in a multilevel image memory, and then they are output together in a superposed condition. This renders both the bilevel (or text) portions and the multilevel (halftone) portions with high quality. However, With this type of conventional device, the difference in resolution between the images brings about a problem when a text image should be superposed on a halftone image, when a halftone image should be partly removed to represent a text image, or when a text image should be filled with a halftone image (i.e. a halftone image should be clipped by the contour of a text image). In such a case, the contour of a character or the boundary between a character and a halftone image is accompanied by an unexpected space or appears unnatural to the viewer's eye.

SUMMARY OF THE INVENTION

It is, therefore, an object of the present invention to provide an image forming apparatus capable of producing high quality images stably and insuring faithful tonality.

An image forming apparatus capable of forming a halftone image of the present invention comprises a bilevel image processing section for processing bilevel image data, a multilevel image processing section for processing multilevel image data, an image forming section for forming an image in response to an image signal output from the bilevel image processing means or the multilevel processing section, a calculating section for summing up density data of pixels surrounding a pixel observed being in each of a plurality of directions to thereby produce sums, a decision circuit for determining which of the sums from the calculating section is greatest, and a control circuit for outputting the direction having the greatest sum as direction data of the pixel being observed.

BRIEF DESCRIPTION OF THE DRAWINGS

The above and others objects, features and advantages of the present invention will become more apparent from the following detailed description taken with the accompanying drawings in which:

FIG. 13 shows output timings of selectors and line memories;

FIG. 14 shows a 3×3 image data matrix;

FIG. 15 shows the directions of a pixel being observed and included in the matrix of FIG. 15;

FIG. 16 demonstrate a specific procedure for calculating direction data;

FIGS. 22A–22I show specific dots to be formed;

FIG. 23 is a table listing a relation between priority order and direction data;

FIG. 25 is a graph representative of changes in gamma characteristic;

FIG. 26 shows a pixel density identification signal; and

FIG. 27 shows the output timings of the selectors and line memories.

DESCRIPTION OF THE PREFERRED EMBODIMENT

Figure 1A:
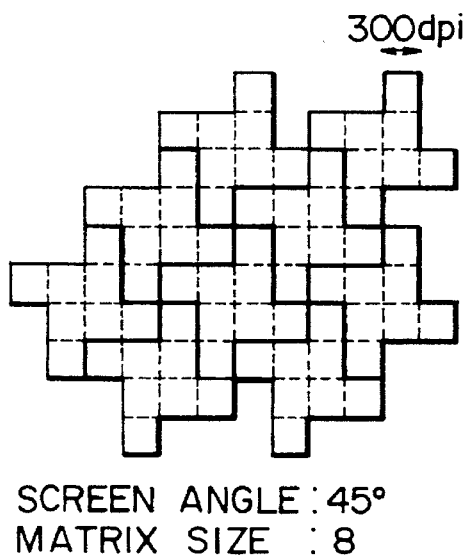
FIGS. 1A–1C show specific images each having a particular matrix size and a particular screen angle.
Figure 1B:
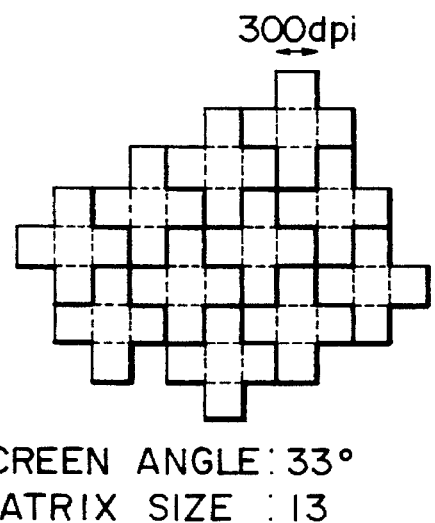
Figure 1C:
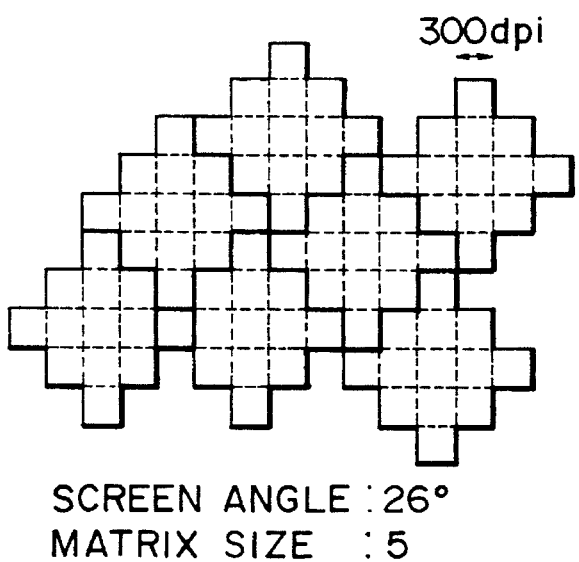
Figures 2A, 2B:
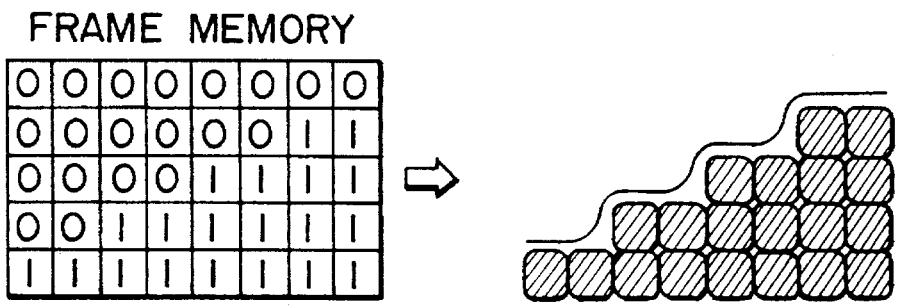
FIGS. 2A and 2B and FIGS. 3A and 3B respectively show a particular condition of a frame memory and an output image associated therewith.
Figures 3A, 3B:
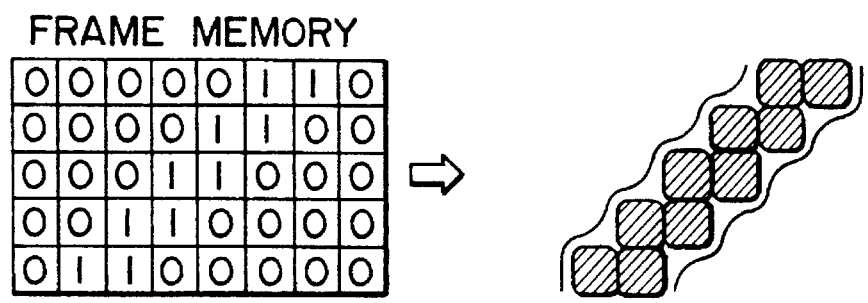

To better understand the present invention, a brief reference will be made to a conventional image forming apparatus of the type to which the present invention pertains. The problem with the conventional apparatus is that the resolution available with a multilevel image memory and, therefore, the matrix size and screen angle are limited. FIGS. 1A, 1B and 1C respectively show an image having a screen angle of 45 degrees and matrix size of 8, an image having a screen angle of 26 degrees and matrix size of 5, and an image having a screen angle of 33 degrees and matrix size of 13. It is impossible with the conventional apparatus to draw any of such images due to the above reason. Further, assume that image data and the apparatus have the same resolution as each other. Then, as FIGS. 2A and 2B and FIGS. 3A and 3B indicate, an oblique line having a step between two consecutive dots ("0 (white)" or "1 (black)") or a two-dot line inclined 45 degrees is unavoidably printed with steps.

Figure 4:
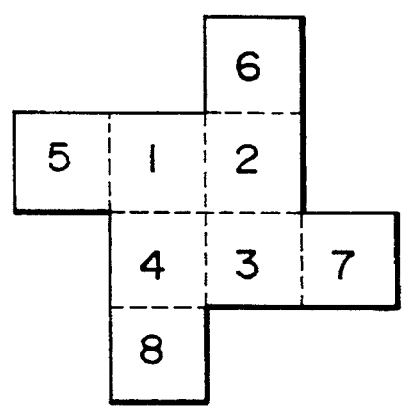
FIG. 4 shows a specific pixel matrix.
Figure 5:
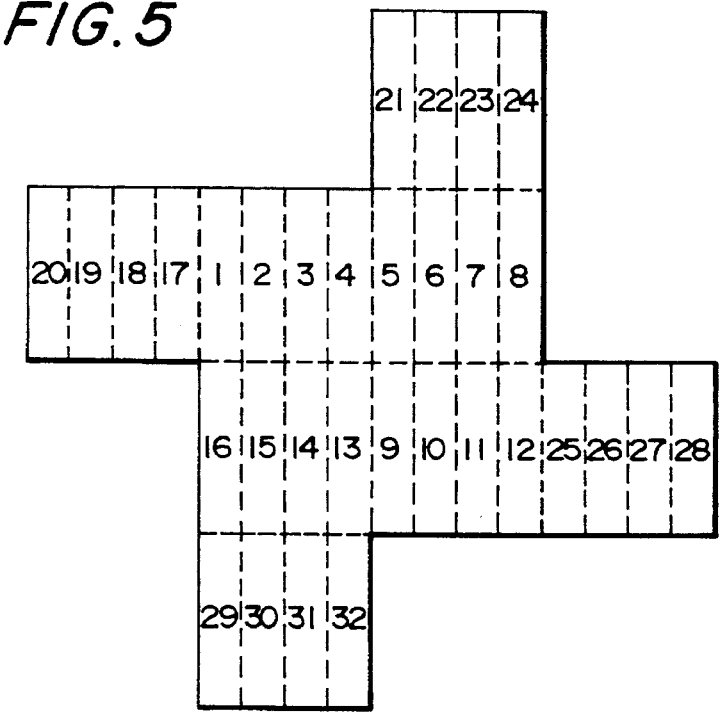
FIG. 5 shows a case wherein in the pixel matrix of FIG. 4, a pulse width per pixel is divided into four.
Figure 6:
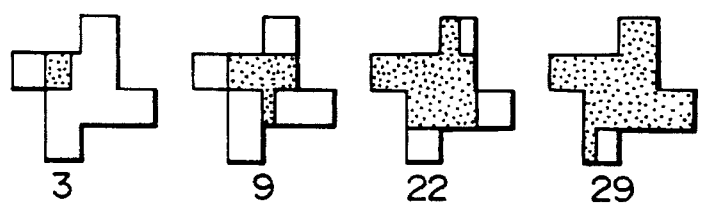
FIG. 6 shows four different dots having tone values of 3, 9, 22 and 22, respectively.

Further, when the basic matrix size 8 and two levels are used to render tonality, more than nine tones cannot be rendered, as shown in FIG. 4. By contrast, the PWM system allows thirty-three tones to be rendered when the pulse width per pixel is divided into four, as shown in FIG. 5. In FIGS. 4 and 5, the numerical values indicate that when the tone is N, the numerical values 1 to N should only be formed in dots. FIG. 6 shows dots whose tones are 3, 9, 22 and 29, respectively. It has been customary with the PWM system to form a matrix by determining how dots should grow at the matrix position beforehand, thereby causing dots to concentrate. Specifically, in FIG. 5, the growth is set such that the dots whose tones are 1 to 12 and 21 to 32 grow from the left-hand side while the dots whose tones are 13 to 20 grow from the right-hand side.

Figure 7:
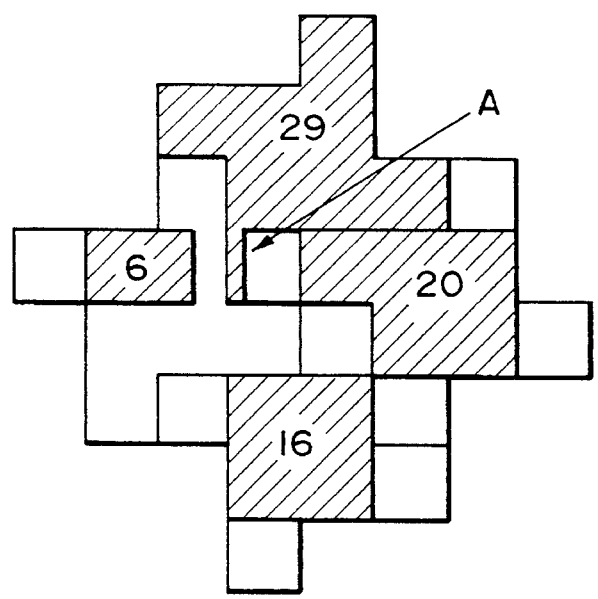
FIG. 7 show a solitary dot included in an image pattern.

However, assuming an image patter shown in FIG. 7, even the PWM type apparatus leaves a dot indicated by an arrow as a substantially solitary dot. As a result, a dot cannot always have an area matching a tone.

Figure 8:
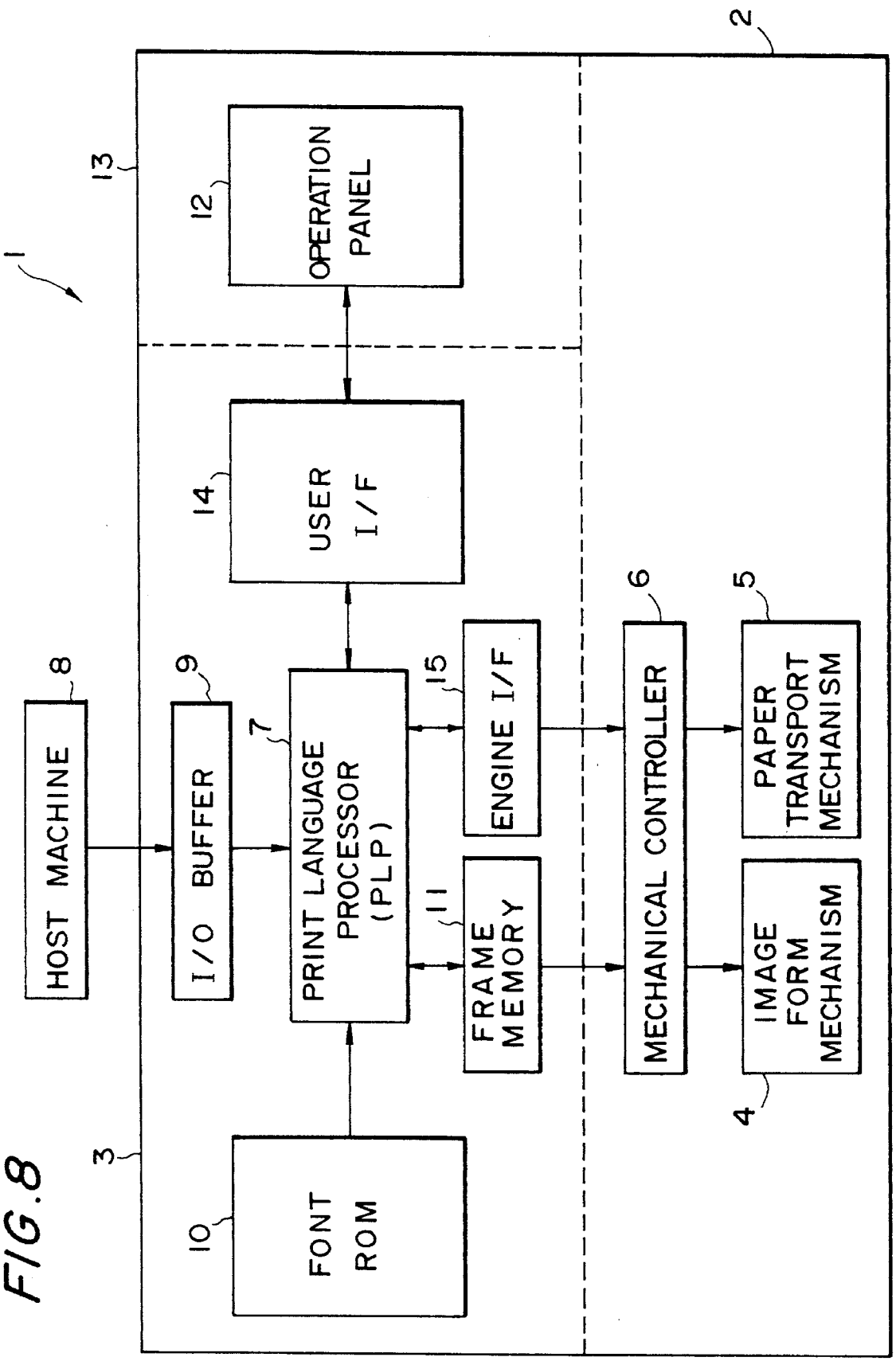
FIG. 8 is a block diagram schematically showing an image forming apparatus embodying the present invention.

Referring to FIG. 8, an image forming apparatus embodying the present invention is shown and implemented as a laser printer by way of example. As shown, the laser printer, generally 1, is made up of an engine 2 and a controller 3. The engine 2 has an image forming mechanism (charging, exposing, developing, transferring and cleaning) 4, a paper transport mechanism (feeding, transferring, transporting, fixing and discharging) 5, and a mechanical controller 6 for controlling the sequence of the mechanisms 4 and 5. Specifically, the controller 3 requests the engine 2 to start operating, checks the conditions of the engine 2, and generates and delivers image data to be displayed and to be printed out. The image data to be dealt with by the controller 3 are raster scanned data. A printer language processor (PLP) 7 is connected to the controller 3. The controller 3 receives character codes and control codes from a host machine 8, stores them in an input/output (I/O) buffer 9, and adjusts the input data rate in matching relation to its own processing ability.

Print data are laid out on a page basis according to character codes and control codes. Regarding a bit map font, since a font ROM (Read Only Memory) 10 stores font data in the form of print images, the contents of the ROM 10 should only be copied into a frame memory 11. For an outline font, the font ROM 10 stores only calculation data for generating a character font; in the event of drawing, the character font is once converted to a bit map font based on the calculation data. Image data is processed according to a screen angle, number of lines and other specified information and then written to the frame memory 11. Graphic data is, for example written to the frame memory 11 after a command associated therewith has been developed on a bit basis by a development algorithm. PDL (Page Description Language), which is represented by Postscript, describes a page. The frame memory 11 is basically implemented by a full-page buffer. The raster image data is read out of the frame memory 11 in synchronism with the engine 2. Such a procedure is repeated page by page.

There are also shown in FIG. 8 an operation panel 12 included in a front panel 13 provided on the printer 1, a user interface (I/F) 14 interconnecting the PLP 7 and operation panel 12, and an engine I/F 15 interconnecting the PLP 7 and engine 2. Let the following description concentrate on Postscript handling multilevel data.

Figure 9:
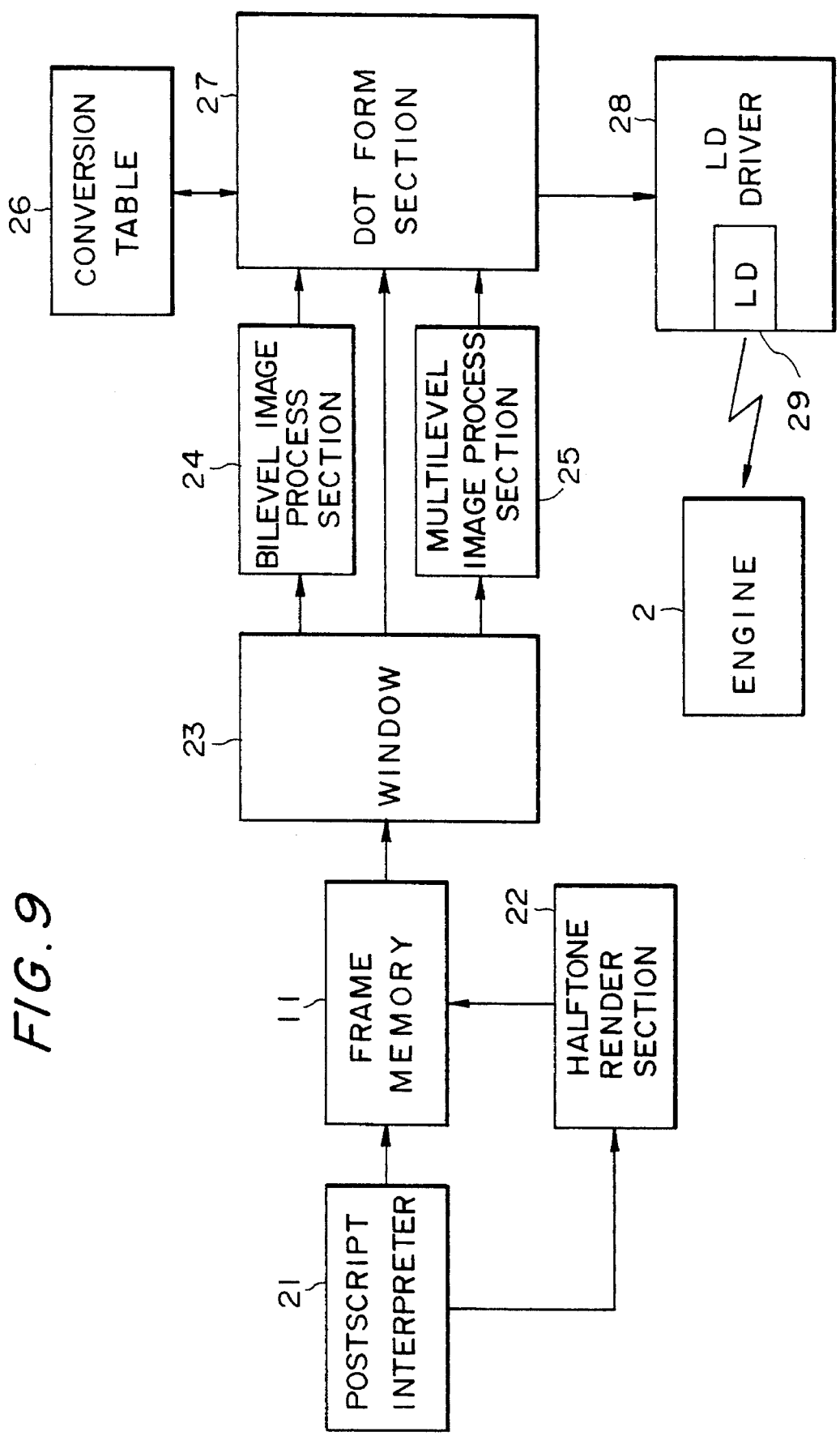
FIG. 9 is a block diagram schematically showing an essential part of the embodiment.

FIG. 9 shows an essential part of the laser printer 1 in a block diagram. As shown, a Postscript interpreter 21 writes bilevel image data in the frame memory 11 in the form of bit map data produced by the above-stated procedure. Regarding multilevel image data, a halftone rendering section 22 forms halftone cells on the basis of a specified number of lines and angle, develops the multilevel data in the halftone cells, and then writes the resulting bit map data in the frame memory 11. The image data read out of the frame memory 11 are applied to a window 23 consisting of line memories and shift registers. A pixel being observed and pixels surrounding it are fed from the window 23 to a bilevel image processing section 24 and a multilevel image processing section 25. A dot forming section 27 is connected to the image processing sections 24 and 25 and to a conversion table 26 for gamma correction. When all the observed data are bilevel data, the dot forming section 27 converts, by referencing the table 26, each pixel data to a dot position and a dot area on the basis of direction data and density data fed from the bilevel image processing section 24. When bilevel data and multilevel data exist together, the dot forming section 27 performs such conversion on the basis of the density data of an observed pixel. Further, when all the observed pixels are multilevel image data, the dot forming section 27 performs the conversion on the basis of direction data and density data fed from the multilevel image processing section 25. The resulting dot position and dot area of each observed pixel are delivered to a laser diode (LD) driver 28. In response, the LD driver 28 modulates an LD 29. Finally, the engine 2 forms an image by optical writing.

Figure 10B:
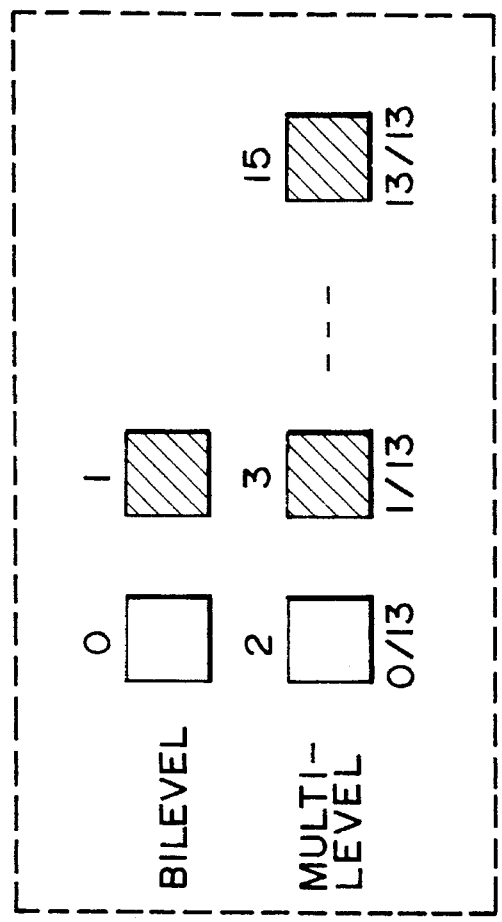
FIGS. 10A and 10B schematically show a frame memory.
Figure 10A:
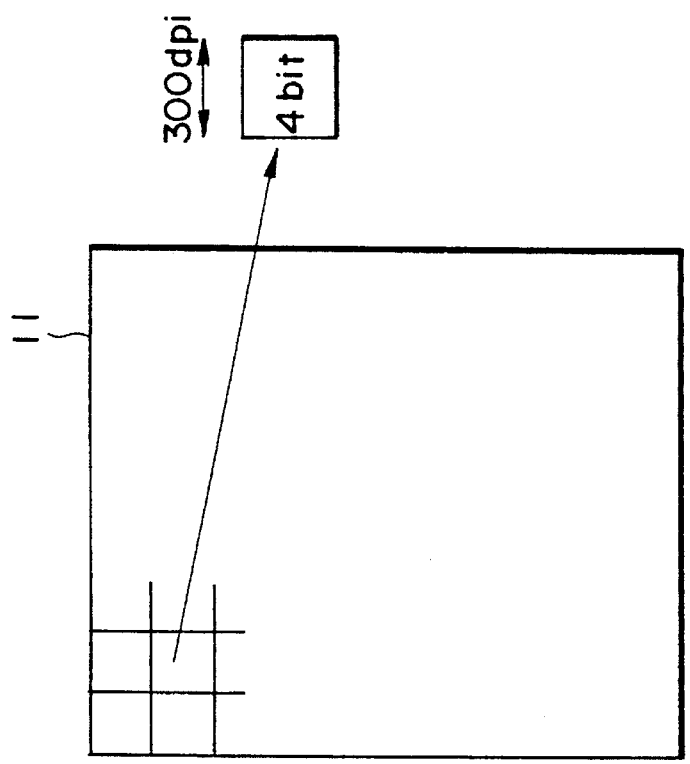

Assume that image data has a pixel density of 300 dpi, that the engine 2 has a pixel density of 600 dpi, that a PWM number per dot is 16, and that the number of data per pixel is four bits by way of example. As shown in FIG. 10A, the frame memory 11 has four bits for a single pixel and, therefore, sixteen levels in total, i.e., 0 to 15. As shown in FIG. 10B, the lower one bit is representative of (logical) "0 (white)" or "1 (black)" of a bilevel image while the other bits 2 to 15 are representative of the density of a multilevel image. Fourteen different densities 0/13 to 13/13 are assigned to a single pixel in the case of multilevel image data.

Figures 11, 11A:
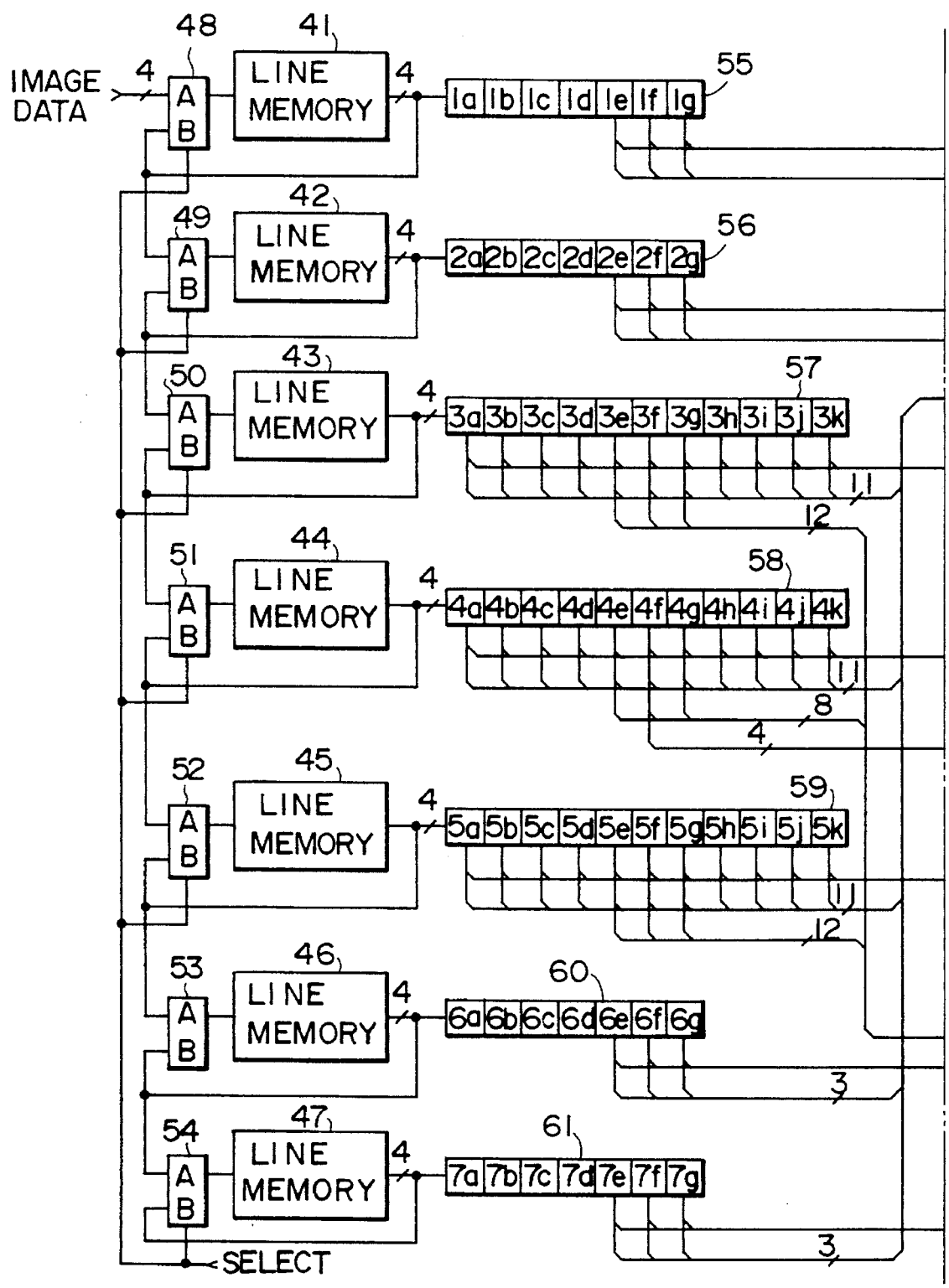
FIG. 11 shows the relationship between FIGS. 11A and 11B.
FIGS. 11A and 11B are schematic block diagrams showing a specific construction of a window.
Figure 11B:
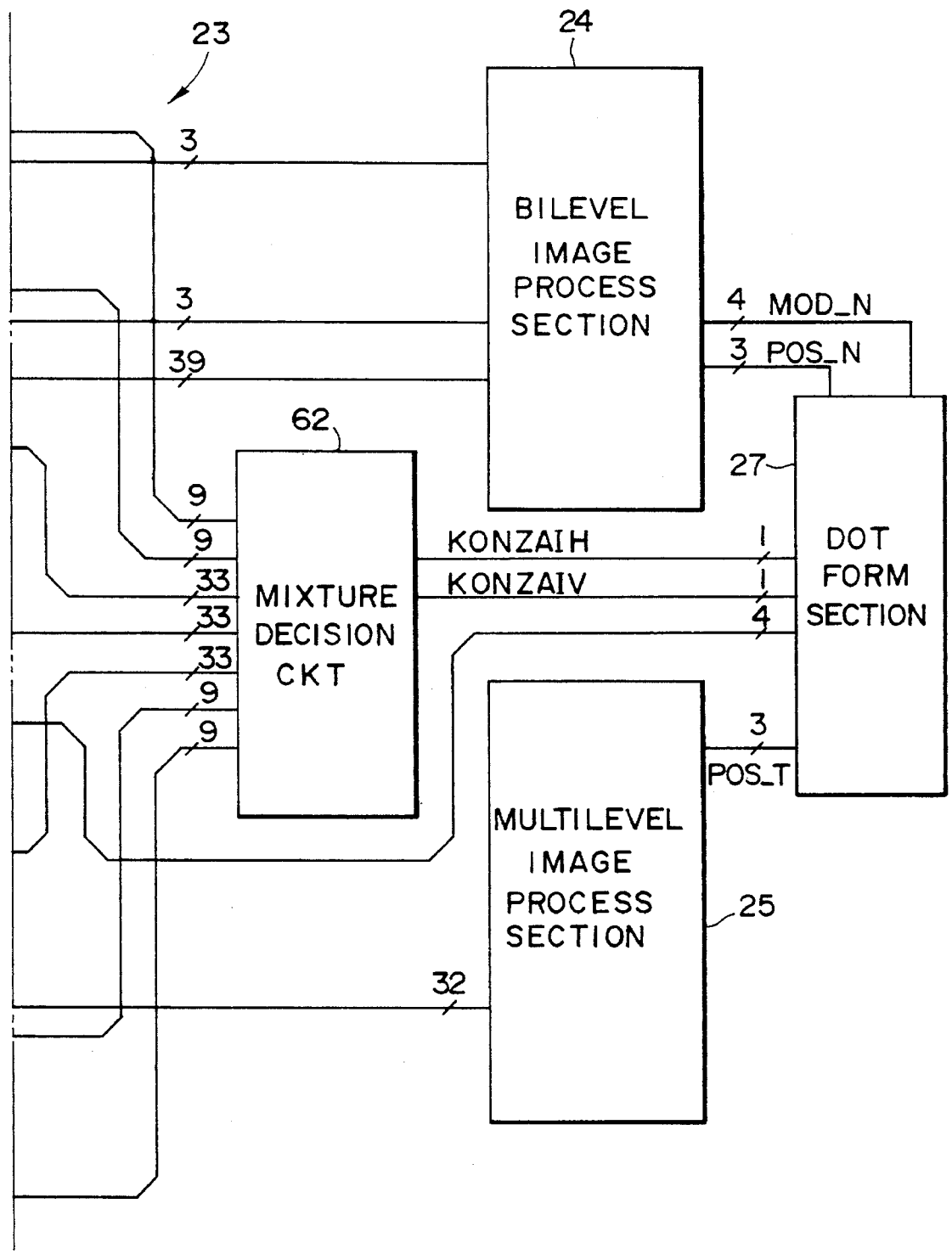
Figure 12:
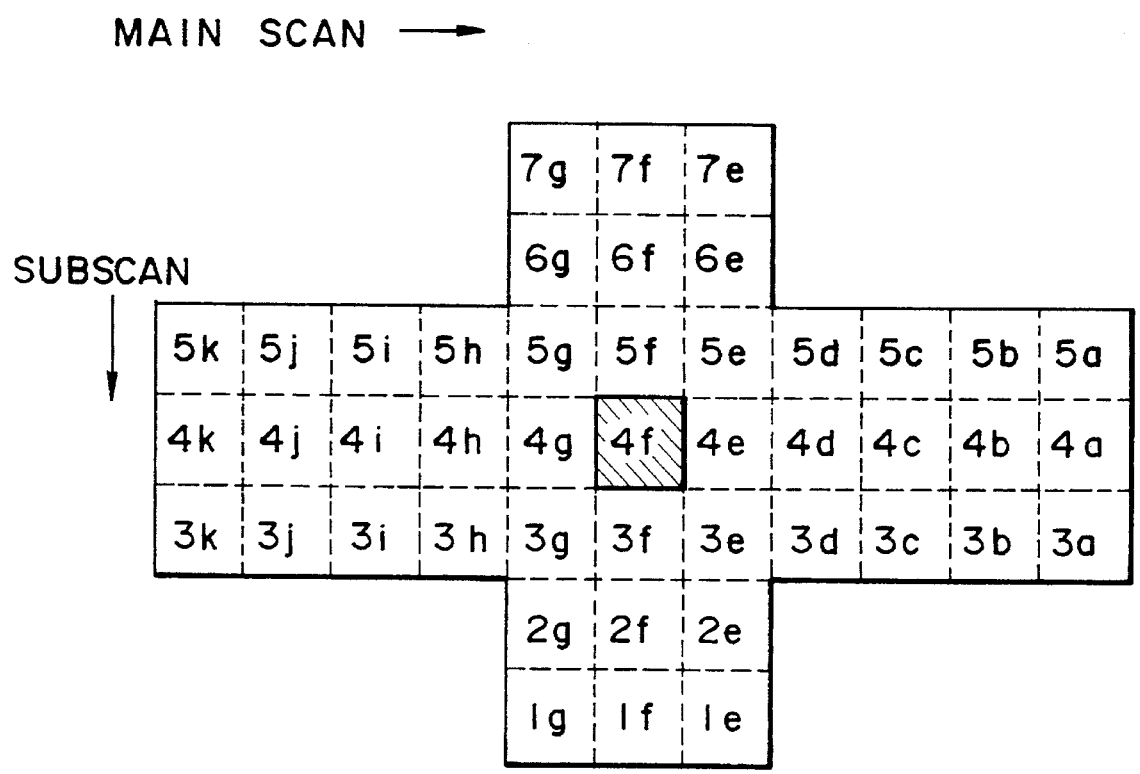
FIG. 12 shows is a positional relation to hold when image data are printed out.

FIG. 11 shows the relationship between FIGS. 11A and 11B. FIGS. 11A and 11B show a specific construction of the window 23. As shown, the window 23 has line memories 41–47 each being capable of storing one line of four-bit image data in the main scanning direction. Data are written to and read out of the line memories 41–47 in synchronism with an image clock signal, not shown. Selectors 48–54 each selects either an input A or an input B thereof in response to a signal SELECT. Specifically, the selectors 48–54 select their inputs A when the signal SELECT is in a low level or selects the inputs B when it is in a high level. Shift registers 55, 56, 60 and 61 are each capable of storing seven image data having a four-bit depth, while shift registers 57, 58 and 59 are shift registers each capable of storing eleven image data having a four-bit depth. A shift clock for clocking the shift registers 55–61 is synchronous with the image clock signal. The shift registers 55–61 respectively output their bits 1e, 1f and 1g, 2e, 2f and 2g, 3a, 3b, . . . , 3k, 4a, 4b, . . . , 4k, 5a, 5b, . . . , 5k, 6e, 6f and 6g, and 7e, 7f and 7g. The upper bits of such output bits are applied to a mixture decision-circuit 62. At the same time, the lowermost one bit, i.e., bilevel image data is fed to the bilevel image processing section 24. The upper four bits of multilevel image data of the shift outputs 3e, 3f, 3g, 4e, 4g, 5e, 5f and 5g are delivered to the multilevel processing section 25. The four-bit data of the shift output 4f, which is associated with an observed pixel, is fed to the dot forming section 27.

FIG. 5 shows a positional relation to hold when the image data fed to the mixture decision circuit 62, bilevel image processing section 24 and multilevel image processing section 25 as stated above are printed out. In the figure, the shift output 4f is the image data of an observed pixel.

In operation, when the signal SELECT is in a low level, the controller 3 outputs the four-bit image data from the frame memory, one main scanning line at a time, in synchronism with a horizontal synchronization detection signal, not shown. The data of the respective pixels are output to the selectors 48–54 in synchronism with the image clock signal. The signal SELECT goes high or goes low in synchronism with the horizontal synchronization detection signal. As a result, the selectors 48–54 each selects the input A or the input B for each line.

FIG. 13 shows the output timings of the selectors and those of the associated line memories. In the figure, L1, L2, . . . , Lm are respectively representative of image data on the "m" lines. Regarding the output of each line, image data changes on a two-line cycle basis. At this instant, image data from the frame memory 11 are also applied to the input A of the selector 48 on a two-line cycle basis.

When all the upper three bits 1e, 1f and 1g, 2e, 2f and 2g, 3e, 3f and 3g, 4e, 4f and 4g, 5e, 5f and 5g, 6e, 6f and 6g, and 7e, 7f and 7g are "0", the mixture decision circuit 62 determines that only bilevel image data exists in a region extending in the vertical direction (subscanning direction), and then causes a vertical decision signal CONZAIV to go high. If not all of them are "0", the decision circuit 62 determines that multilevel image data exists together with bilevel image data, and then causes the decision signal CONZAIV to go low. On the other hand, when all the upper bits 3a, 3b, . . . , 3k, 4a, 4b, . . . , 4k, and 5a, 5b, . . . , 5k are "0", the decision circuit 62 determines that only bilevel data is present in an area extending in the horizontal direction (main scanning direction), and then causes a horizontal decision signal CONZAIH to go high. If not all of them are "0", the decision circuit 62 determines that multilevel image data is present together with bilevel image data, and then causes the signal CONZAIH to go low.

Hereinafter will be described a specific image processing procedure relating to multilevel image data. FIG. 14 shows a 3×3 image data matrix having a pixel 4f being observed at the center. Such image data are applied from the window 23 to the multilevel image processing section 25, FIG. 9. As shown in FIG. 15, assume that the pixel of interest 4f has eight different-directions. Each pixel has four-bit density data and can render a multilevel image density for each dot, i.e., 2(0/13) to 15(13/13), as stated earlier. Here, 5g is representative of four bits of {5g_3, 5g_2, 5g_1, 5g_0} where "5g_n" is representative of the "n" bit of 5g_n.

By the above computation, the multilevel image processing section 25 outputs direction data. Specifically, the processing section 25 allocates three pixels to each direction and produces a sum thereof. For example, assuming a specific matrix shown in FIG. 16, the processing section 25 calculates the individual directions, as follows:

$$UL=4g+5g+5g=43$$

$$UP=5g+5g+5e=42$$

$$UR=5f+5e+4e=37$$

$$RI=5e+4e+3e=30$$

$$LR=4e+3e+3f=28$$

$$LW=3e+3f+3g=30$$

$$LL=3f+3g+4g=37$$

$$LE=3g+4g+5g=41$$

Subsequently, the processing section 25 searches for the greatest one of the sums UL-LE and outputs direction data representative of the greatest sum. In this case, the processing section 25 outputs the upper left direction data UL having a value 43 as, direction data POS_T.

Figure 19A:
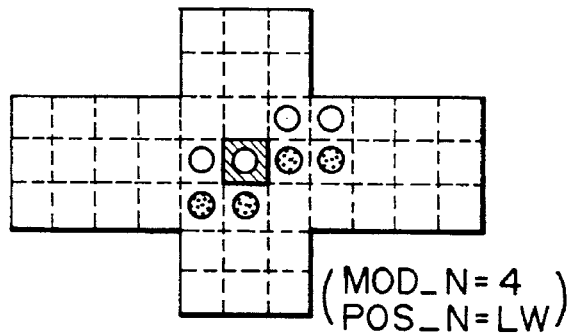
FIGS. 19A–19F show specific decision patterns to be used by a decision circuit.
Figure 19B:
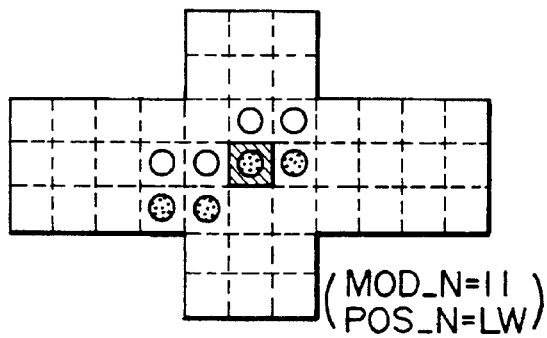
Figure 19C:
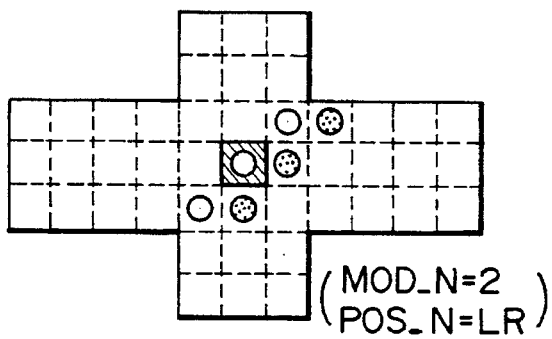
Figure 19D:
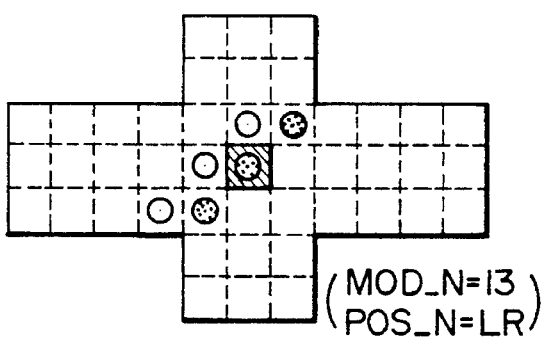
Figure 19E:
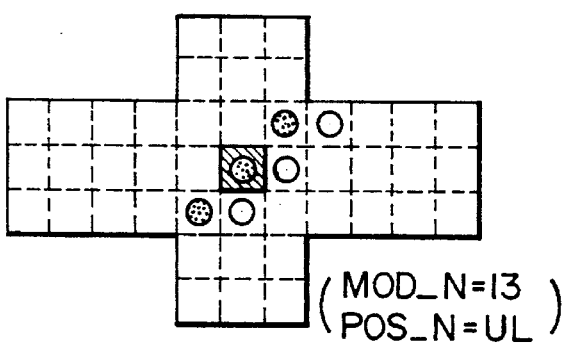
Figure 19F:
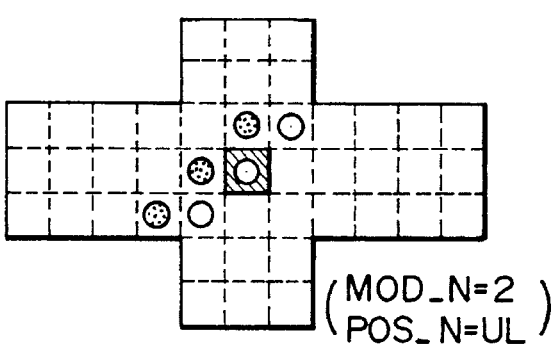

A specific procedure for processing bilevel image data is as follows. The bilevel image processing section 24 includes a discrimination circuit for identifying a boundary line between black and white. When the discrimination circuit has detected a boundary line, there are output particular density data and particular direction data associated with an observed pixel and which render the boundary line smooth. This is done by use of a plurality of decision patterns. Specifically, FIG. 17 shows an oblique line having a step between two consecutive dots. In this case, by using patterns shown in FIGS. 19A and 19B, the discrimination circuit determiners that the line is an oblique line having a two-dot step. Then, if the pattern of FIG. 19A matches the line, the discrimination circuit outputs density data (MOD_N) 4 and direction data (POS_N) LW for the observed pixel. If the pattern of 19B matches the line, the decision circuit outputs density data (MOD_N) 11 and direction data (POS_N) LW. At this instant, the direction data is output as previously described with reference to FIG. 15, while density data lies in the range of from 0 to 15.

Figure 17A:
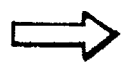
FIGS. 17A and 17B and FIG. 18A and 18B each shows a specific relation between the condition of the frame memory and the output image.
Figure 17B:
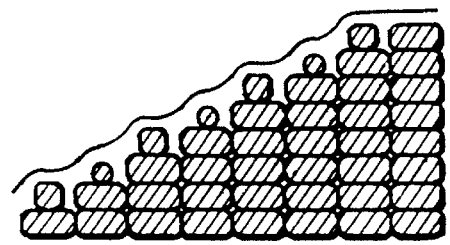

Assuming that an oblique line inclined 45 degrees is constituted by two dots, the discrimination circuit uses decision patterns shown in FIGS. 19C–19F. Specifically, the discrimination circuit outputs density data and direction data for the observed pixel pattern by pattern. As a result, the pixels indicated by hatching in FIGS. 17A and 17B are smoothed as observed pixels. Smoothing will, of course, become more accurate as the number of decision patterns and the number of pixels referenced increase.

Figure 20:
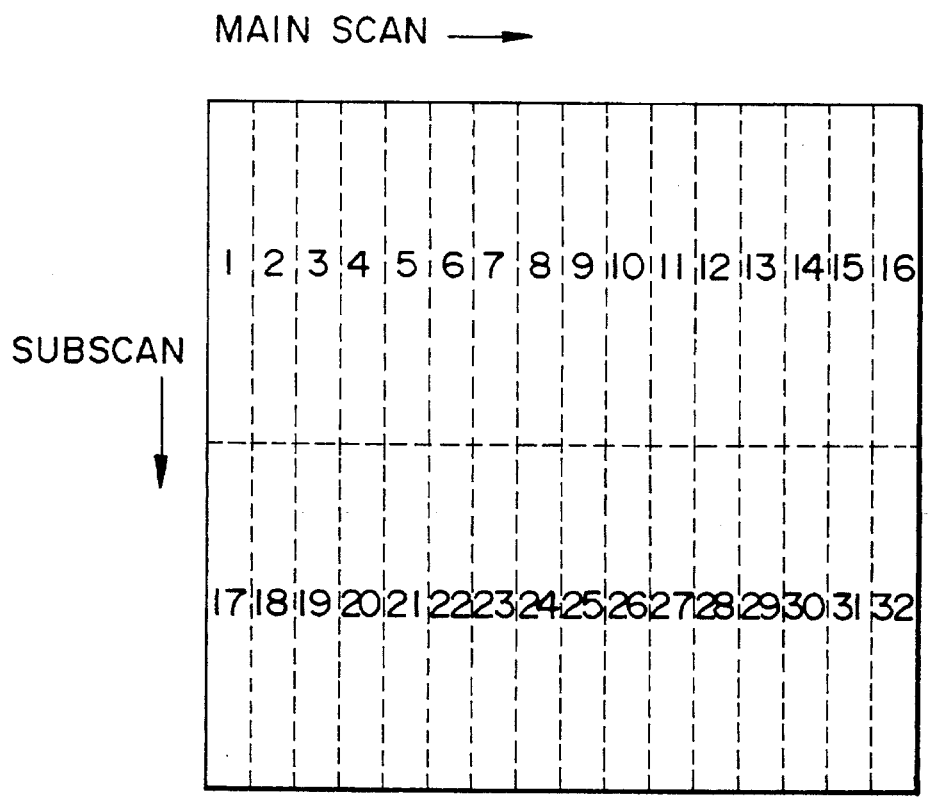
FIG. 20 shows how a single dot is divided.
Figure 21:
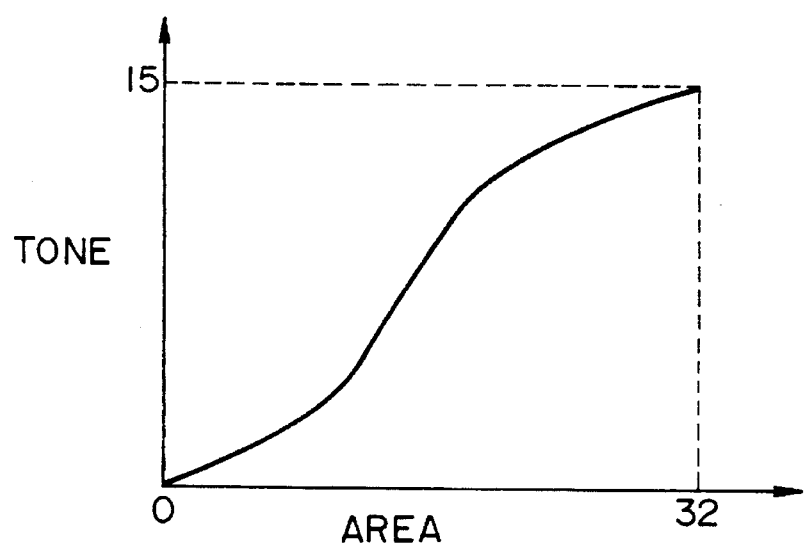
FIG. 21 is a graph indicative of a gamma characteristic.

Since the PWM number per dot is 16 and since the resolution in the subscanning direction is 600 dpi, which is double the resolution of image data, a single dot is divided into 16×2=32, as shown in FIG. 20. It follows that a single dot can be rendered by any one of thirty-three different areas, i.e., 0 to 32. Assume that the number of tones per pixel and the number of areas per dot have a gamma characteristic shown in FIG. 21. Generally, such a gamma characteristic is not proportional. In light of this, the conversion table 26 stores gamma correction data which make the densities between the consecutive tones per dot equal.

The dot forming section 27 produces one of the areas 1–32 for forming a dot on the basis of the input density data and direction data. Specifically, it starts forming a dot in the direction indicated by the direction data, using the gamma-converted value of the density data. Typical of such dots are shown in FIGS. 22A–22I. Here, assume that the density data 2, 7 and 14 are subjected to gamma conversion, and that the area values are converted to 7, 14 and 25.

Figures 24A, 24B:
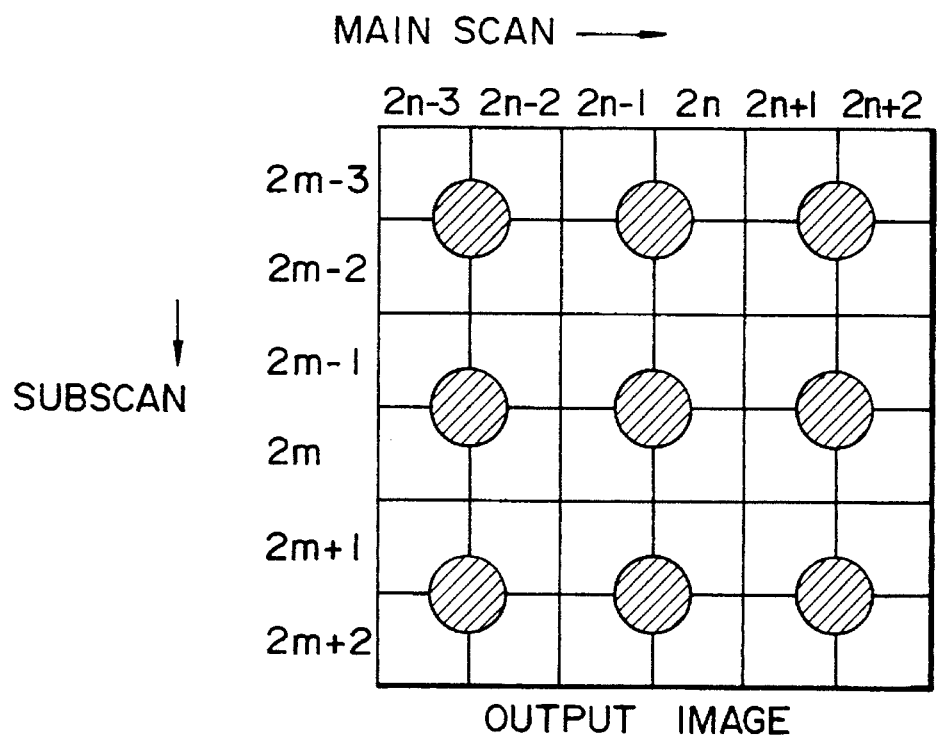
FIGS. 24A and 24B respectively show specific density data of pixels adjoining a pixel being observed, and an output image associated therewith.

When a plurality of directions have the greatest value, they are output according to a particular priority order. As shown in FIG. 23, the priority order changes in the subscanning direction and main scanning direction on the basis of a pixel-by-pixel count. Specifically, assume that all pixels surrounding an observed pixel have the same density data, as shown in FIG. 24A. Then, priority is sequentially given to the lower right, lower left, lower right, lower left and so forth on the "2m–1" line, and the upper right, upper left, upper right, upper left and so forth on the "2m" line. As a result, an image shown in FIG. 24B results from the image data of FIG. 24A. However, images include halftone images of the kind needing high resolution. In light of this, the embodiment may be provided with selecting means which allows the operator to form a dot at the center, invalidating the direction data determined by the priority order. Such selecting means may be implemented by the host machine 1 or the operation panel 6.

Figure 18A:
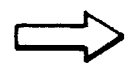
Figure 18B:
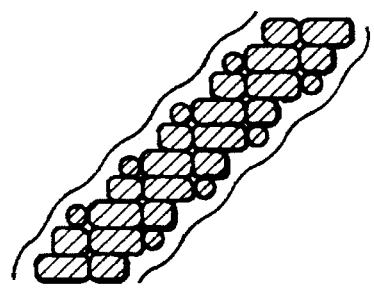

Assume that the observed pixel is bilevel image data, and that a boundary line between black and white is detected by horizontal decision patterns. If the mixture decision circuit 62 determines that all the pixels adjoining observed pixels in the horizontal direction are bilevel image data (KONZIH in high level), dots are formed on the basis of density data MOD_N and direction data POS_N output from the bilevel image processing section 24. On the other hand, assume that the observed pixel is bilevel image data, and that a boundary line between black and white is detected by vertical decision patterns. Then, if the decision circuit 62 determines that all the pixels adjoining the observed pixels in the vertical direction are bilevel image data (CONZAIV in high level), dots are formed on the basis of density data MOD-N and direction data POS_N output from the processing section 24. However, if the observed pixels are multilevel data, dots are formed on the basis of direction data POS_T and the density data 4f of the observed pixel output from the multilevel image processing section 25. Further, assume that the observed pixel is bilevel data and that multilevel data are present in the surrounding pixels in the horizontal and vertical directions (both KONZAIH or KONZAIV in low level). Then, if the observed pixels are "0 (white)", dots are formed with density data 0; if they are "1 (black)", dots are formed with density data 15. Such control is successful in outputting the images of FIGS. 17B and 17B respectively corresponding to the conditions of frame memory shown in FIG. 17A and 18A.

Generally, the gamma characteristic changes due to the environment and aging, ask shown in FIG. 25. To compensate for such changes, the conversion table 26 is further provided with a several different groups of conversion data each having a particular gamma characteristic. Means for selecting a desired group of conversation data is provided and designated on the operation panel 12 or host machine 8. Specifically, as shown in FIG. 26, a pixel density identification signal is applied to the dot forming section 27 and window 23. In response, the dot forming section 27 identifies pixel density and then executes processing matching the pixel density; the window 23 causes, when the input signal is indicative of 300 dpi, the selectors 48–54 to select only their inputs A (see FIG. 27).

While the foregoing description has concentrated on an engine pixel density of 600 dpi, bisection is effected with each dot in the subscanning direction. For example, assume that the engine 2 is selectively operable with a pixel density of 300 dpi, 600 dpi, or 900 dpi. Then, the dot forming section 27 identifies the engine pixel density as indicated by the pixel density identification signal, and executes control such that the number of divided areas is equal to the product of the number of divided areas in the main scanning direction and that of divided areas in the subscanning direction. Assuming that the number of divisions for 300 dpi is thirty-two, then control is effected such that 32×1=32, 16×2= 32 and 11×3=33 hold for 300 dpi, 600 dpi, and 900 dpi, respectively. As a result, the same tonality is maintained for each dot despite the change in pixel density. The control over direction data will also be changed depending on the pixel density.

In summary, it will be seen that the present invention provides an image forming apparatus having various unprecedented advantages, as enumerated below.

(1) The dots of observed pixels are most concentrated, rendering high quality halftone images stably.

(2) A boundary line between black and white of a bilevel image is rendered smooth.

(3) Tonality not depending on environment or aging can be faithfully reproduced.

(4) High quality smoothing and high quality halftone images are achievable. In addition, control not depending on pixel density can be effected even with an image forming apparatus having a pixel density changing function. Even an engine having a different pixel density can be controlled by the same control circuitry.

(5) Whether or not to execute the above control can be selected on an operation panel or a host machine, as desired.

Various modifications will become possible for those killed in the art after receiving the teachings of the present disclosure without departing from the scope thereof.

What is claimed is:

1. An image forming apparatus capable of forming a halftone image, comprising:

bilevel image processing means for processing bilevel image data;

multilevel image processing means for processing multilevel image data;

an image forming section for forming an image in response to an image signal output from said bilevel image processing means or said multilevel processing means;

calculating means for summing up density data of surrounding pixels surrounding an observed pixel in each of a plurality of directions to thereby produce sums;

decision means for determining which of said sums from said calculating means is greatest; and control means for outputting the direction having the greatest sum as direction data of the observed pixel.

2. An apparatus as claimed in claim 1, further comprising:

counting means for counting pixels in a subscanning direction and pixels in a main scanning direction; and priority determining means for giving a particular priority order to the plurality of directions which matches a count output from said counting means;

said control means outputting, when two or more of said plurality of directions have the greatest sum, direction data of the observed pixel according to the particular priority order.

3. An apparatus as claimed in claim 2, further comprising selecting means for determining, when all the sums of density data are equal, whether a dot should be formed based on the direction data according to the priority order, or whether a dot should be formed at a center by neglecting said direction data.

4. An apparatus as claimed in claim 1, further comprising dot forming means for controlling a position where a dot should be formed and an area of said dot on the basis of the the density data of the observed pixel and the direction data of said pixel output from said multilevel image processing section.

5. An apparatus as claimed in claim 4, wherein said dot forming means comprises a plurality of conversion tables for gamma correction, and selecting means for selecting one of said plurality of conversion tables.

6. An apparatus as claimed in claim 4, further comprising inputting means for inputting a pixel density signal, said dot forming means changing control in response to said pixel density signal.

7. An apparatus as claimed in claim 1, further comprising:

a window comprising line memories and shift registers; and determining means for comparing the observed pixel and the surrounding pixels fed from said window to thereby determine whether all of said observed pixel and said surrounding pixels are bilevel image data or whether said observed pixel and said surrounding pixels include multilevel image data.

8. An apparatus as claimed in claim 7, wherein said calculating means sums up density data of the surrounding pixels and fed from said window in each of the plurality of directions to thereby produce sums.

9. An apparatus as claimed in claim 7, wherein said bilevel image processing means has decision patterns for identifying a boundary between black and white in response to the observed pixel and the surrounding pixels fed from said window, said bilevel image processing means smoothing, when said observed pixel and said surrounding pixels match any one of said decision patterns, bilevel image data by outputting direction data and density data of said observed pixel which correspond to the matching decision pattern.

10. An apparatus as claimed in claim 7, further comprising dot forming means for controlling a position for forming a dot and an area of said dot on the basis of the density data and direction data output from said bilevel image processing means when the observed pixel is binary image data and said determining means determines that all the pixels surrounding said observed pixel are bilevel image data, or on the basis of the density data of said observed pixel when said determining means determines that multilevel image data exists around said observed pixel, or on the basis of the direction data and the density of said observed pixel output from said multilevel image processing means when said observed pixel is multilevel image data.

11. An apparatus as claimed in claim 10, wherein said dot forming means comprises a plurality of conversion tables for gamma correction, and selecting means for selecting one of said plurality of conversion tables.

12. An apparatus as claimed in claim 7, wherein a resolution in the subscanning direction is an integral multiple of a resolution of image data.

13. An apparatus as claimed in claim 10, further comprising inputting means for inputting a pixel density signal, control over said window or said dot forming means being changed in response to said pixel density signal.

* * * * *